United States Patent
Gretz (10) Patent No.: US 10,014,626 B1
(45) Date of Patent: Jul. 3, 2018

(54) COMPRESSION CONNECTOR FOR TERMINATING GROUNDING ELECTRODES

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

( * ) Notice: Subject to any disclaimer, the term of this patent is extended or adjusted under 35 U.S.C. 154(b) by 0 days.

(21) Appl. No.: 15/617,661

(22) Filed: Jun. 8, 2017

Related U.S. Application Data (60) Provisional application No. 62/348,162, filed on Jun. 10, 2016.

(51) Int. Cl.
*H01R 13/622* (2006.01)
*H01R 13/595* (2006.01)
*H01R 4/38* (2006.01)
*H01R 4/44* (2006.01)
*H01R 13/58* (2006.01)

(52) U.S. Cl.
CPC ....... *H01R 13/622* (2013.01); *H01R 13/5825* (2013.01); *H01R 13/595* (2013.01); *H01R 4/38* (2013.01); *H01R 4/44* (2013.01)

(58) Field of Classification Search
CPC .. H01R 13/622; H01R 4/5091; H01R 4/5075; H01R 13/746; H01R 4/50; H01R 4/38; H01R 4/5083; H01R 4/44
USPC ................................. 439/807, 810, 811, 813
See application file for complete search history.

(56) References Cited

U.S. PATENT DOCUMENTS

| | | | |
|---|---|---|---|
| 895,747 A * | 8/1908 | Guett | ..................... H01R 4/363 439/811 |
| 4,213,669 A | 7/1980 | Wittes et al. | |
| 5,197,907 A | 3/1993 | Hurtgen | |
| 5,681,172 A | 10/1997 | Moldenhauer | |
| 5,929,383 A | 7/1999 | Marik et al. | |
| 5,981,172 A | 11/1999 | Simons et al. | |
| 6,596,939 B1 * | 7/2003 | Gretz | ........................ F16L 5/00 174/152 G |
| 6,860,758 B1 * | 3/2005 | Kiely | ..................... H01R 4/363 174/652 |
| 7,281,932 B2 | 10/2007 | Cheng et al. | |

* cited by examiner

Primary Examiner — Renee Luebke
Assistant Examiner — Paul Baillargeon (57) ABSTRACT

A compression connector including a tubular connector body with a through bore, a flange, a leading end and a trailing end for connecting ground conductors to a load center. A nose extends from the flange to the leading end and a trailing body portion extends to the trailing end. A boss on the connector body includes a threaded bore and an opening on each side of the boss. A screw within the threaded bore of the boss holds a clip to the connector body. The clip includes two legs with arcuate ends that bisect the through bore. Insertion of a grounding electrode conductor into the through bore and tightening of the clip enables a secure connection of the conductor grounding electrode to the connector body. A threaded nose and a locknut are provided on the compression connector to facilitate attachment of the leading end of the connector body to a knockout aperture in a load center.

5 Claims, 7 Drawing Sheets

COMPRESSION CONNECTOR FOR TERMINATING GROUNDING ELECTRODES

This application claims priority to provisional U.S. Application No. 62/348,162, filed Jun. 10, 2016, the contents of which is herein incorporated by reference in its entirety.

FIELD OF THE INVENTION

This invention relates to electrical fittings or connectors for connecting electrical cables to a panel and specifically to a compression connector for connecting ground conductors to a load center.

BACKGROUND OF THE INVENTION

Grounding connections on circuit breaker load centers or panelboards for residential and industrial applications typically include wire lugs on a neutral support bar which acts as a ground for the support center. To ground electrical cables, the ground conductors are typically brought into the load center and their insulation-free ends are clamped in the wire lugs. Unfortunately the construction of load centers and panelboards with lugs is costly both from a manufacturing and inventory standpoint. Furthermore, in a conventional load center the wire lugs are attached to the neutral/ground bar and the bar and lugs are typically are not constructed to provide proper strain relief to any attached ground wires.

Accordingly, it would be advantageous to provide an alternative method of grounding conductors which will eliminate the need for lugs on the load center or panelboard. It would also be advantageous to provide a connector or fitting that attaches directly to the panelboard and thereby functions as a strain relief for the ground wire.

BRIEF SUMMARY OF THE INVENTION

The current invention is a compression connector for connecting ground conductors to a load center. The compression connector includes a tubular connector body with a through bore, a flange, a leading end, and a trailing end. A nose extends from the flange to the leading end and a trailing body portion extends to the trailing end. The connector body includes a boss with a threaded bore and an opening on each side of the boss. A screw within the threaded bore of the boss holds a clip to the connector body. The clip includes two legs with arcuate ends that bisect the through bore. Insertion of a grounding electrode conductor into the through bore and tightening of the clip enables a secure connection of the conductor grounding electrode to the connector body. A threaded nose and a locknut are provided on the compression connector to facilitate attachment of the leading end of the connector body to a knockout aperture in a load center or panelboard.

OBJECTS AND ADVANTAGES

It is accordingly an object of the invention to provide a compression connector for terminating grounding electrodes to panelboards and enclosures.

It is a further object of the invention to provide a compression connector that eliminates the need for installing lugs on the frames of load centers.

It is a further object of the invention to provide a simple means of securely connecting grounding electrode conductors to a knockout aperture in a load center or panelboard.

It is a further object of the invention to provide improved strain relief for ground wires that are attached to a panelboard or load center.

It is a further object of the invention to provide a compression connector for grounding electrodes in which the ground wires are secured directly to the panelboard versus directly to the neutral/ground bar.

Other objects of the invention will be obvious in view of the following description and with reference to the accompanying drawings.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
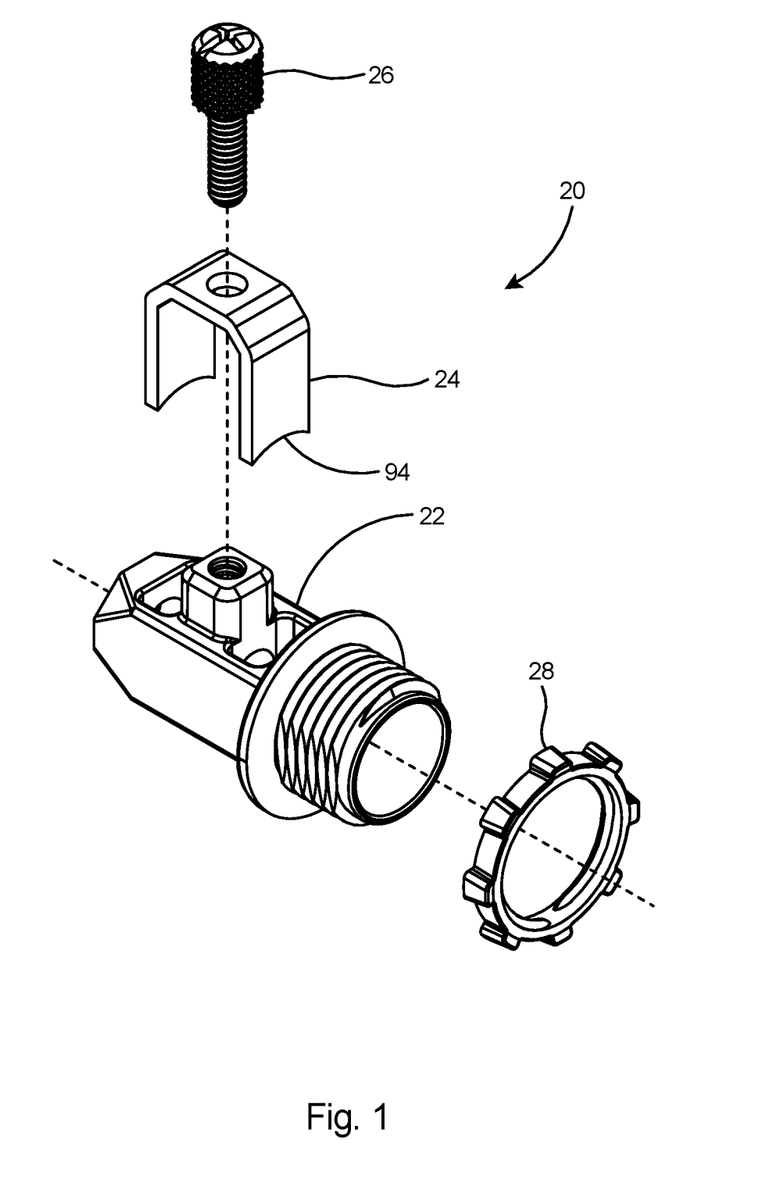
FIG. 1 is an exploded isometric view of a compression connector in accordance with embodiments of the invention.

Referring to FIG. 1, in accordance with embodiments of the present invention, there is shown a compression connector 20 including a tubular connector body 22, a clip 24, a screw 26, and a lock nut 28.

Figure 2:
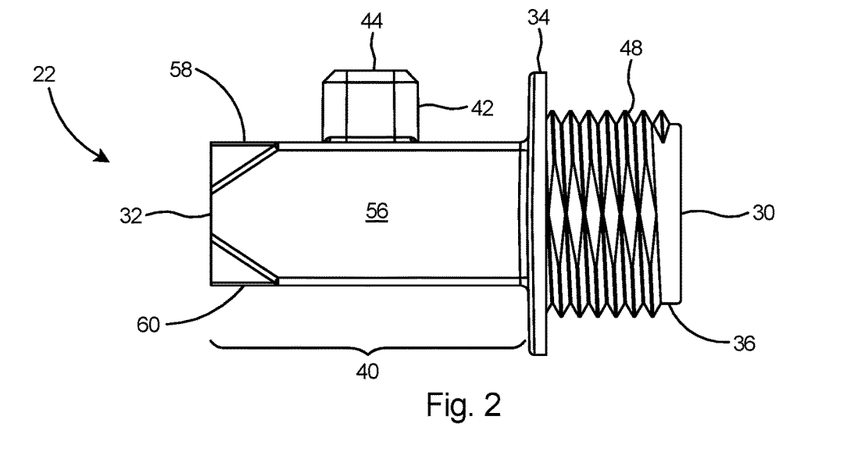
FIG. 2 is a side view of a connector body that forms a portion of the compression connector of FIG. 1.
Figure 3:
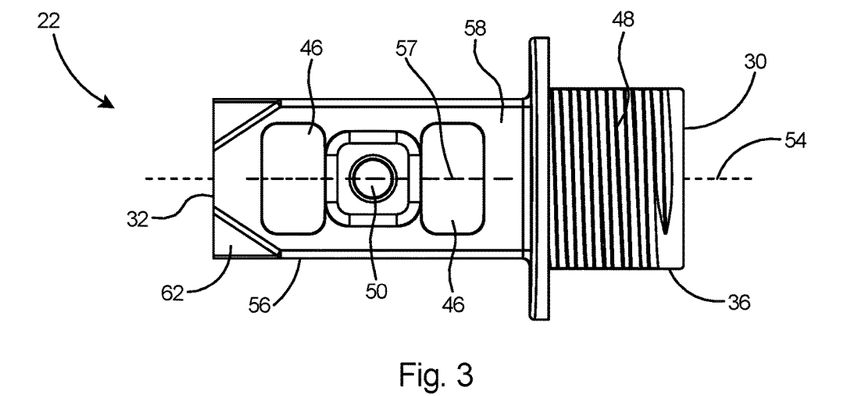
FIG. 3 is a top view of the connector body.
Figure 4:
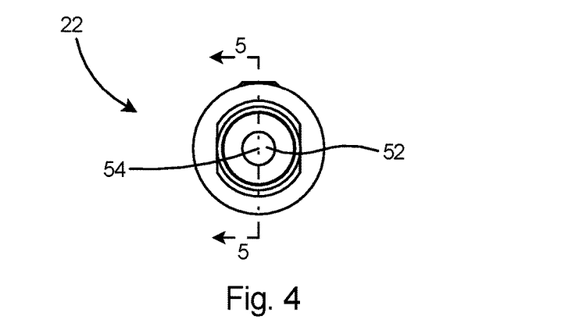
FIG. 4 is an end view of the connector body.

With reference to FIGS. 2-4, the connector body 22 includes a leading end 30, a trailing end 32 and a flange 34. A nose 36 extends forward of the flange and a tubular trailing body portion 40 extends rearward of the flange 34. In operation the leading end 30 of the connector body will be connected to a knockout aperture in a load center and the trailing end 32 will accept secure connection of a grounding electrode conductor (not shown) thereto. Connector body 22 further includes a boss 42 with a flat top 44 extending laterally from a mid-portion of the trailing body portion 40. Boss 42 extends outward of the connector body 22. A substantially rectangular opening 46 is provided on either side of the boss. Nose 36 may include threads 48. Boss 42 includes a threaded bore 50 therein. The connector body 22 includes a through bore 52 which is aligned along a central axis 54 extending through the tubular connector body. Trailing body portion 40 includes four flat sidewalls 56 including a top wall 58 and a bottom wall 60 and beveled edges 62 on the trailing end 32. As viewed from the top of the connector in FIG. 5, the openings 46 are centered laterally on the connector body and are aligned longitudinally along the connector body with the center axis 57 of the openings 46 substantially parallel with the central axis 54 of the connector body 22

Figure 5:
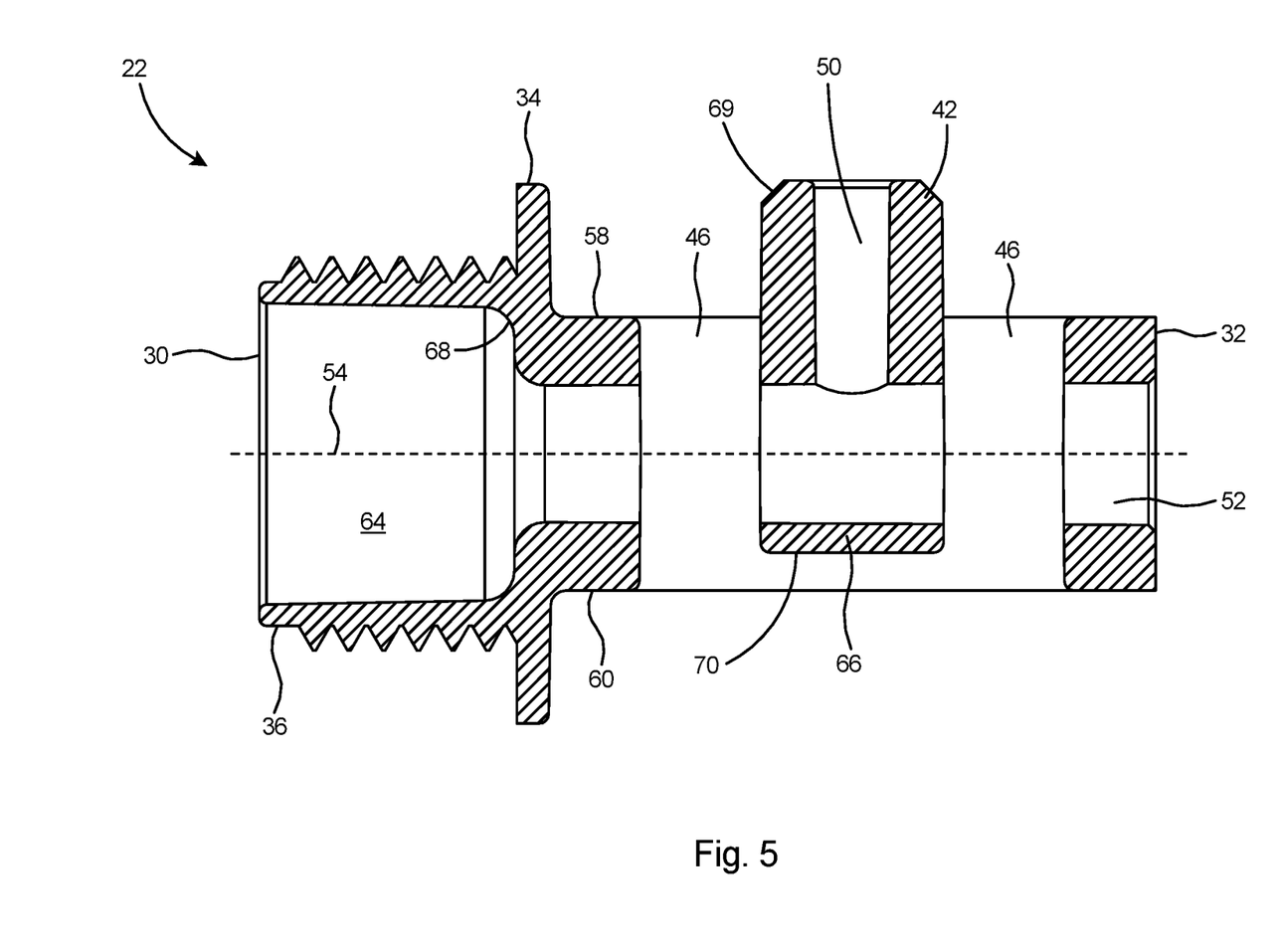
FIG. 5 is a sectional view of the connector body taken along line 5-5 of FIG. 4.

As shown in FIG. 5 openings 46 extend completely through the connector body 22 on both sides of the boss 42 from the top wall 58 to the bottom wall 60. Through bore 52 extends through the trailing body portion 40 and through the boss 42. Through bore 52 includes a wide bore 64 in the nose portion 36 of the connector body. Threaded bore 50 of boss is axially aligned at 90 degrees with respect to through bore 52. The boss 42 includes a stop wall 66 which will function to stop the travel of a screw that is advanced into threaded bore 50. Wide bore 64 of nose 36 includes arcuate corners 68. Boss 42 includes beveled corners 69.

Figure 6:
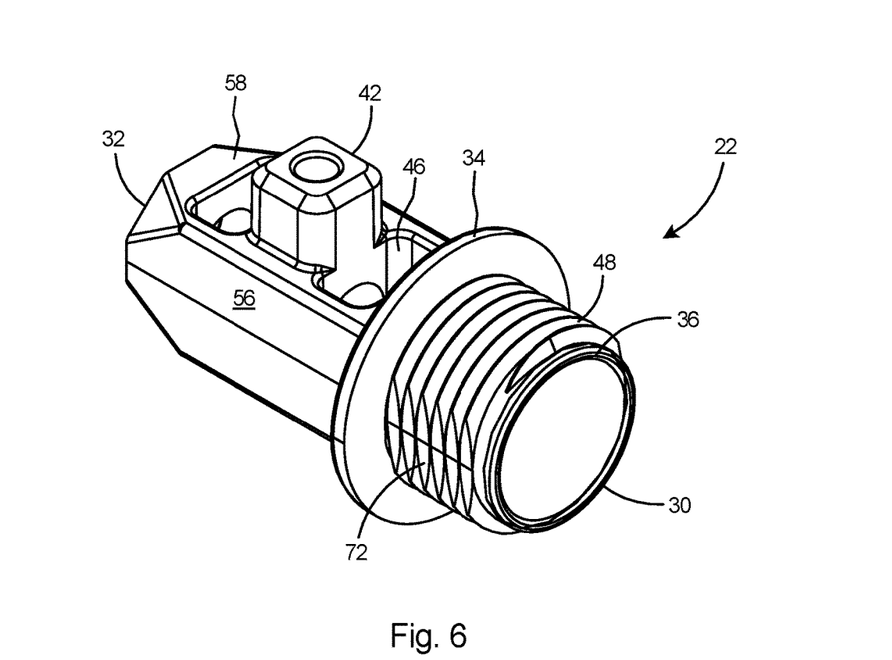
FIG. 6 is an isometric view of the connector body from the leading end.
Figure 7:
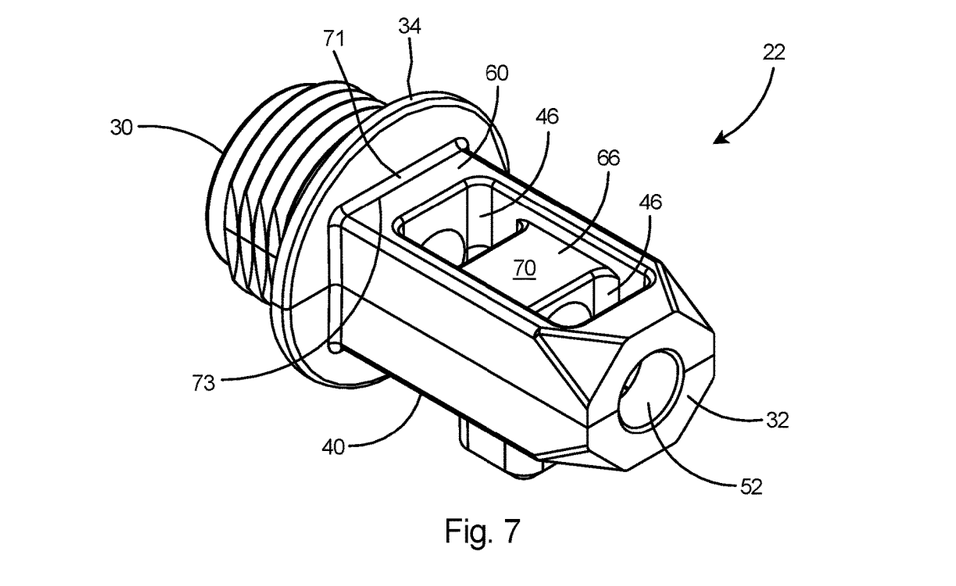
FIG. 7 is an isometric view of the connector body from the trailing end.

Referring to FIGS. 6 and 7, stop wall 66 includes a bottom surface 70 that is recessed away from the bottom wall 60 of the trailing body portion 40. Threads 48 of nose 36 include truncated portions 72 to facilitate easy insertion of nose 36 through a knockout aperture (not shown). When a knockout is removed from a steel box, burrs are sometimes left around the periphery of the knockout aperture, the truncated portions 72 enable the nose portion of the connector body to slip easily through the knockout aperture by simple rotation of the compression connector with respect to the box or panel. A filet 71 is provided at the juncture 73 of the trailing body portion 40 and flange 34. Filet 71 extends around the entire periphery of the juncture.

Figure 8:
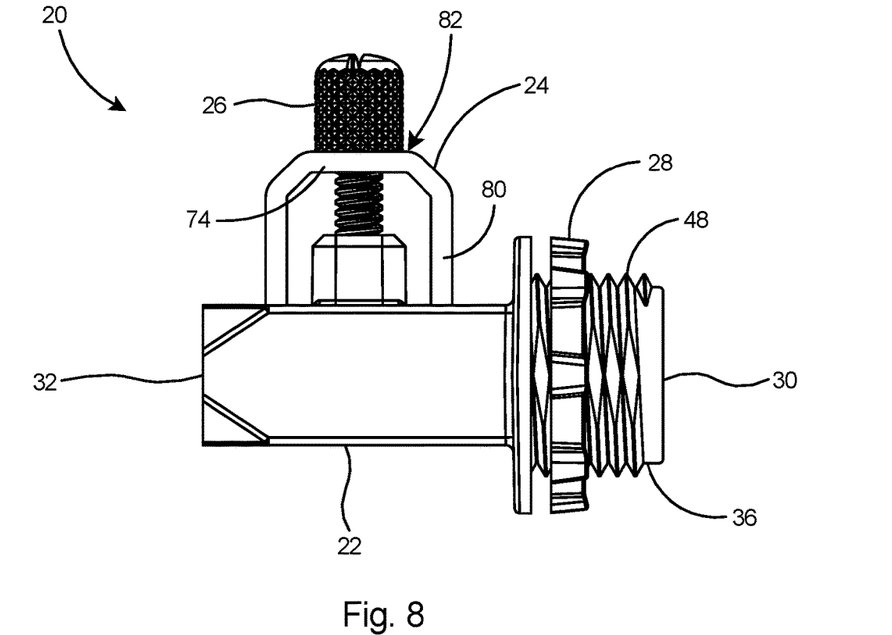
FIG. 8 is a side view of the compression connector of FIG. 1.
Figure 9:
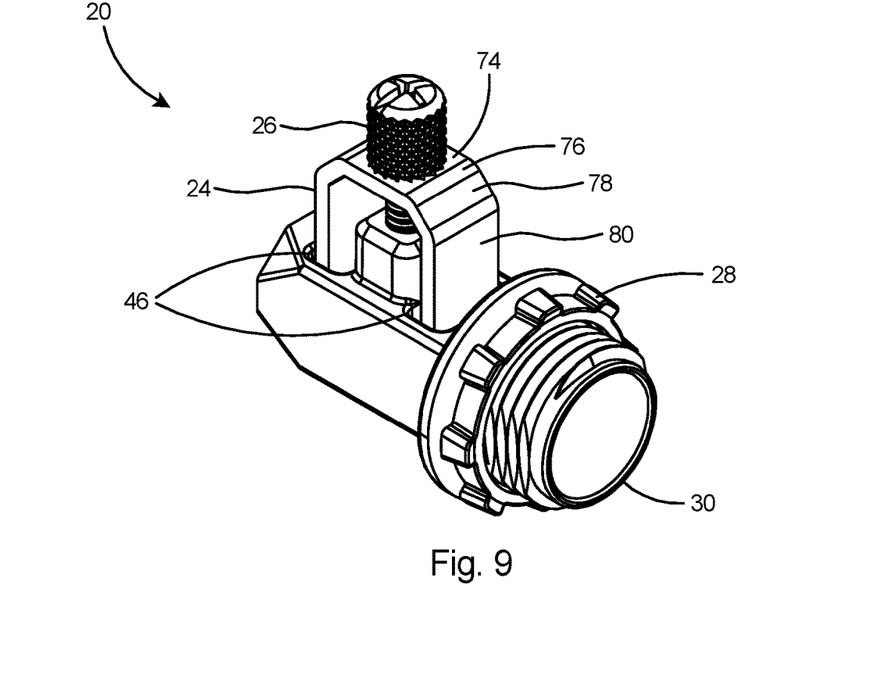
FIG. 9 is an isometric view of the compression connector.
Figure 10:
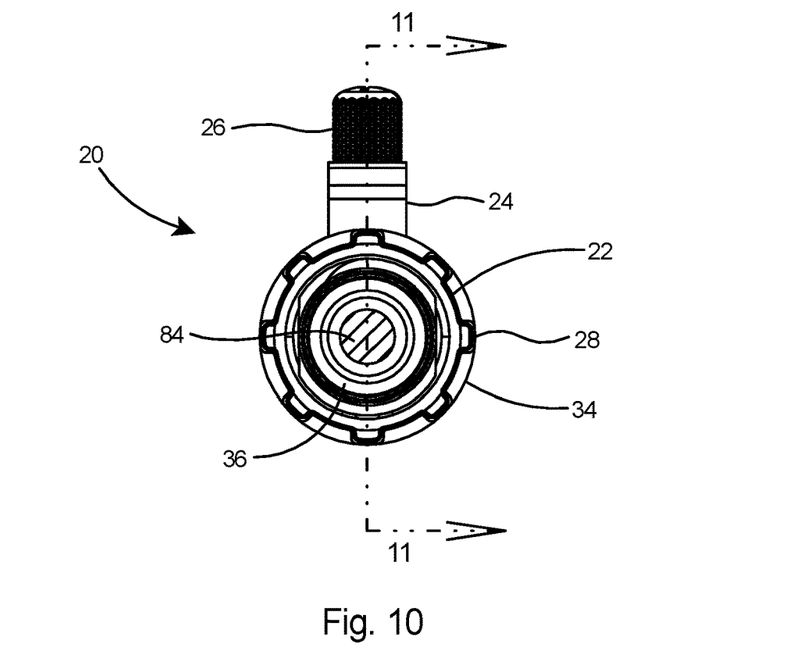
FIG. 10 is an end view of the compression connector as viewed from the leading end.

With reference to FIGS. 8 and 9, the compression connector 20 is an assembly including the connector body 22, the clip 24, the screw 26, and the lock nut 28. The lock nut 28 is internally threaded to facilitate threaded engagement with threads 48 on nose 36 of connector body 22. Clip 24 is substantially U-shaped and includes a base 74 with two ends 76, shoulders 78, and legs 80 extending from the ends of the base. Top 82 of base 74 is flat to facilitate flush engagement with the head of the screw 26 such as the knurled head machine screw 26 depicted in FIGS. 8 and 9. Screw 26 holds the clip 24 to the connector body 22 in such a manner that legs 80 extend into openings 46.

Figure 11:
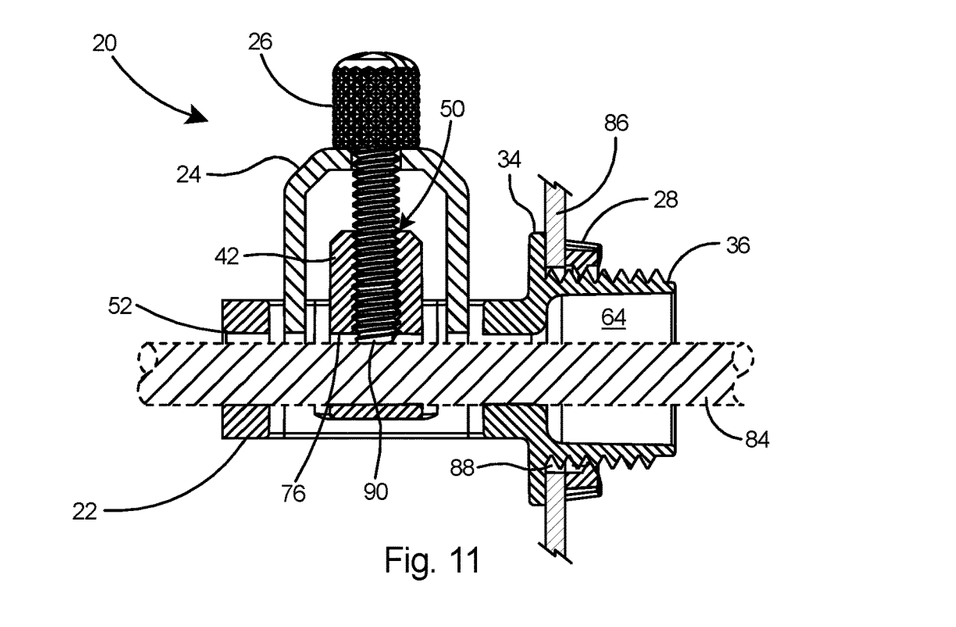
FIG. 11 is a sectional view of the compression connector taken along line 11-11 of FIG. 10.

Referring to FIG. 11, the compression connector 20 is used to secure a grounding electrode conductor 84 to a load center or panelboard, of which a wall portion 86 is depicted in FIG. 11. To secure the grounding electrode conductor to a knockout aperture 88 in the wall, the nose 36 of the compression connector 20 is inserted into the aperture until flange 34 of connector body 22 is flush against the wall, after which the lock nut 28 is tightened against the wall 86 and connector. Grounding electrode conductor 84, or the stripped end of a ground conductor in an electrical cable, is then inserted into the through bore 52 of connector body 22 until it extends beyond bore 50 in boss 42. The screw 26 is then tightened until distal end 90 of screw 26 compresses against the grounding electrode conductor 84, thereby locking the grounding electrode conductor to the connector. The compression connector thus eliminates the need for installing lugs on the frames of load centers. The compression connector further provides adequate strain relief for grounding electrode conductors to a panelboard or load center, preventing the grounding electrode from being easily removed from the load center.

Figure 12:
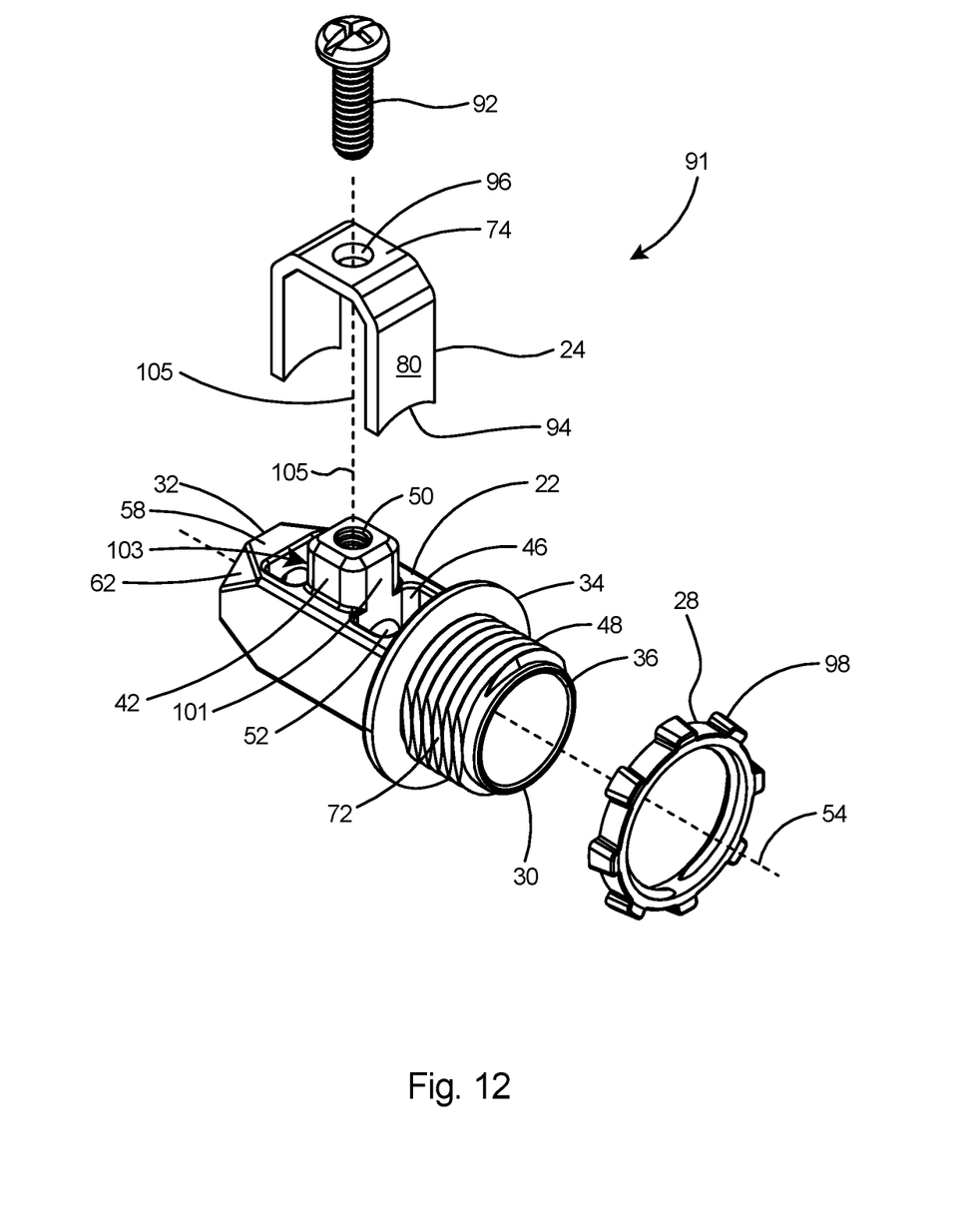
FIG. 12 is an exploded isometric view of a second embodiment of a compression connector in accordance with embodiments of the invention.

With reference to FIG. 12, the second embodiment of the compression connector 91 includes the tubular connector body 22, the clip 24, a screw 92, and a lock nut 28. In this embodiment the screw is a pan-head machine screw. The clip 24 includes two legs 80, each with an arcuate end 94, and a base 74 with an aperture 96 for insertion of screw 92 therein. Locknut 28 includes lugs 98 to facilitate a grip thereon for tightening of locknut 98 onto threads 48 on nose 36 of connector body 22. Boss 42 of connector body 22 includes a leading wall 101 facing the leading end 30 and a trailing wall 103 facing the trailing end 32 of the connector body. Threaded bore 50 in boss 42 includes an axis 105 and the axial alignment of the threaded bore 50 is preferably perpendicular to the central axis 54 of the connector body 22.

The tubular connector body 22, clip 24, knurled head machine screw 26, and lock nut 28 are all preferably constructed of metal. The connector body is most preferably die-cast in one piece of zinc alloy.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A compression connector, comprising:
    a tubular connector body including a leading end, a trailing end, a top wall, a flange, a trailing body portion, and a through bore including a central axis;
    a boss on said trailing body portion of said connector body;
    an opening in said connector body;
    a clip including a leg, said leg extending into said opening of said connector body;
    a screw for maintaining alignment of said clip with respect to said connector body and enabling adjustment of a distance of insertion of said leg of said clip within said opening;
    another opening in said connector body,
    a first of said openings adjacent a leading wall of said boss;
    a second of said openings adjacent a trailing wall of said boss; and
    said openings are centered laterally on the connector body along a center axis and are aligned longitudinally along the connector body with the center axis of the openings substantially parallel with the central axis of the connector body;
    two legs on said clip, each of said legs extending through a corresponding one of said openings in said connector body; and
    said clip is U-shaped.

2. The compression connector of claim 1, further comprising:
    a leading wall and a trailing wall on said boss; and
    a nose on said leading end of said connector body.

3. The compression connector of claim 1, further comprising:
    an arcuate end on each leg of said clip; and
    said arcuate end is substantially perpendicular to said central axis of said connector body.

4. A compression connector, comprising:
    a tubular connector body including a nose, leading end, a trailing end, a top wall, a flange, a trailing body portion, and a through bore including a central axis;
    a boss on said trailing body portion of said connector body, said boss including a threaded bore;
    an opening in said connector body;

a clip including a leg, said leg extending into said opening of said connector body;

a screw for maintaining alignment of said clip with respect to said connector body and enabling adjustment of a distance of insertion of said leg of said clip within said opening;

a stop wall on said boss, said stop wall arresting advancement of the screw into the threaded bore;

a bottom wall on said trailing body portion;

a bottom surface on said stop wall;

said bottom surface of said stop wall is recessed from said bottom wall of said trailing body portion;

a wide bore in said nose of said connector body; and said wide bore is of a larger diameter than said through bore;

arcuate corners on said connector body in said wide bore;

beveled edges on said trailing end of said connector body; and a flat top and beveled corners on said boss.

5. A compression connector, comprising:

a tubular connector body including a leading end, a trailing end, a top wall, a flange, and a through bore including a central axis;

a boss extending from said top wall of said connector body, said boss including a leading wall, a threaded bore, and a trailing wall;

an opening in said connector body;

a nose on said leading end of said connector body;

a trailing body portion on said trailing end of said connector body;

a clip including a leg extending into said opening of said connector body;

a screw for maintaining alignment of said clip with respect to said connector body and enabling adjustment of a distance of insertion of said leg of said clip within said opening; and a stop wall on said boss, said stop wall arresting advancement of the screw into the threaded bore;

a bottom wall on said trailing body portion;

a bottom surface on said stop wall; and said bottom surface of said stop wall is recessed from said bottom wall of said trailing body portion.

\* \* \* \* \*